United States Patent [19]

Ausnit

[11] Patent Number: 4,657,792

[45] Date of Patent: Apr. 14, 1987

[54] FUNNEL MATERIAL FOR BAGS AND METHOD

[75] Inventor: Steven Ausnit, New York, N.Y.

[73] Assignee: Minigrip, Incorporated, Orangeburg, N.Y.

[21] Appl. No.: 735,277

[22] Filed: May 17, 1985

[51] Int. Cl.[4] .......... B32B 1/02; B32B 1/04

[52] U.S. Cl. .......... 428/35; 156/66; 156/250; 156/251; 156/292; 156/324; 383/63; 428/57; 428/223

[58] Field of Search .......... 156/66, 250, 251, 290, 156/324, 292; 383/63, 97; 428/57, 223, 35; 493/198; 83/46

[56] References Cited

U.S. PATENT DOCUMENTS 3,291,177 12/1966 Naito .......... 383/63

3,685,562 8/1972 Ausnit .......... 383/63 X 3,875,837 4/1975 Dassaud .......... 83/46

4,196,030 4/1980 Ausnit .......... 156/91

*Primary Examiner*—Robert A. Dawson

[57] ABSTRACT

Funnel material for bags and a method of making the same, wherein elongated sheet panels are disposed in face-to-face relation and secured along an intermediate longitudinally extended zig-zag joinder and separation line. This provides a pair of funnel strips each of which has a series of funnel pockets at its edge along the line. Bag body wall sheets attached to the panels are arranged to receive the funnel pockets of each strip in inwardly extending relation therebetween, for providing respective reversible funnels in bags into which the strips and bag wall sheets are adapted to be divided. The panels may carry separable fastener profiles adjacent their edges remote from the zig-zag line.

19 Claims, 6 Drawing Figures

FIG. 1
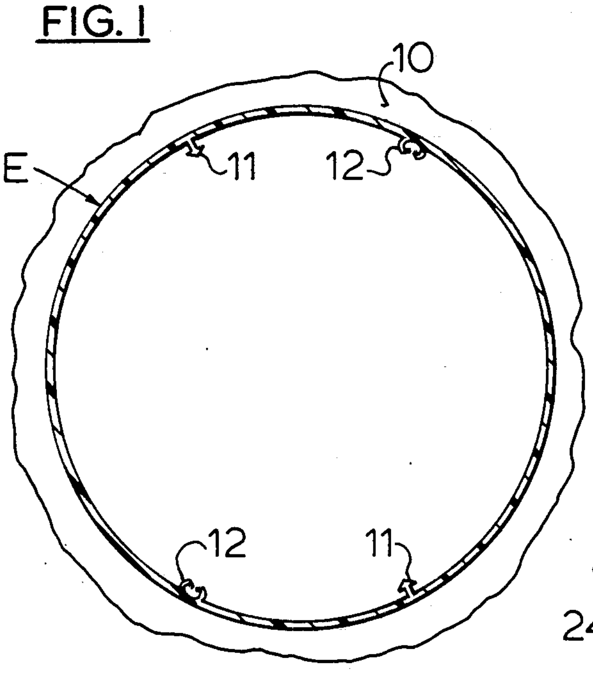
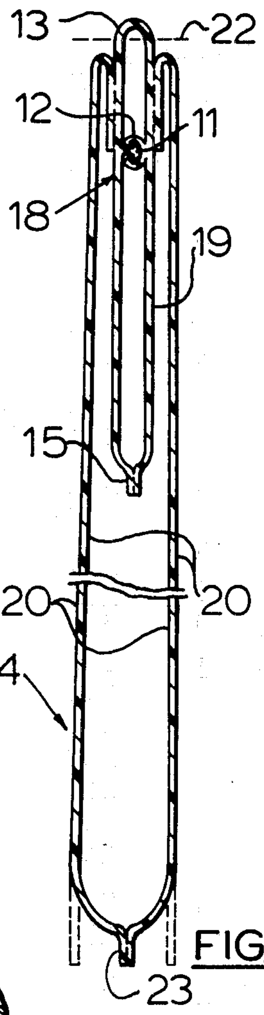
FIG. 3
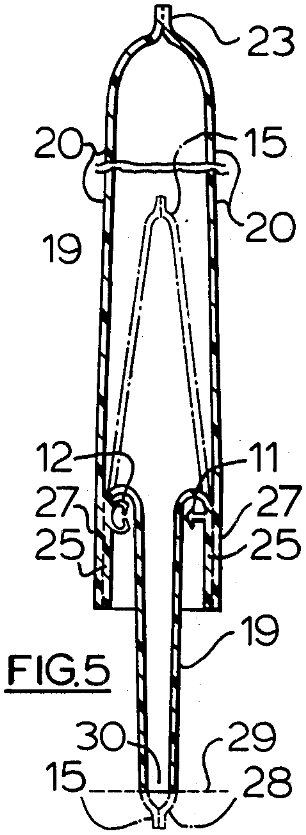
FIG. 5
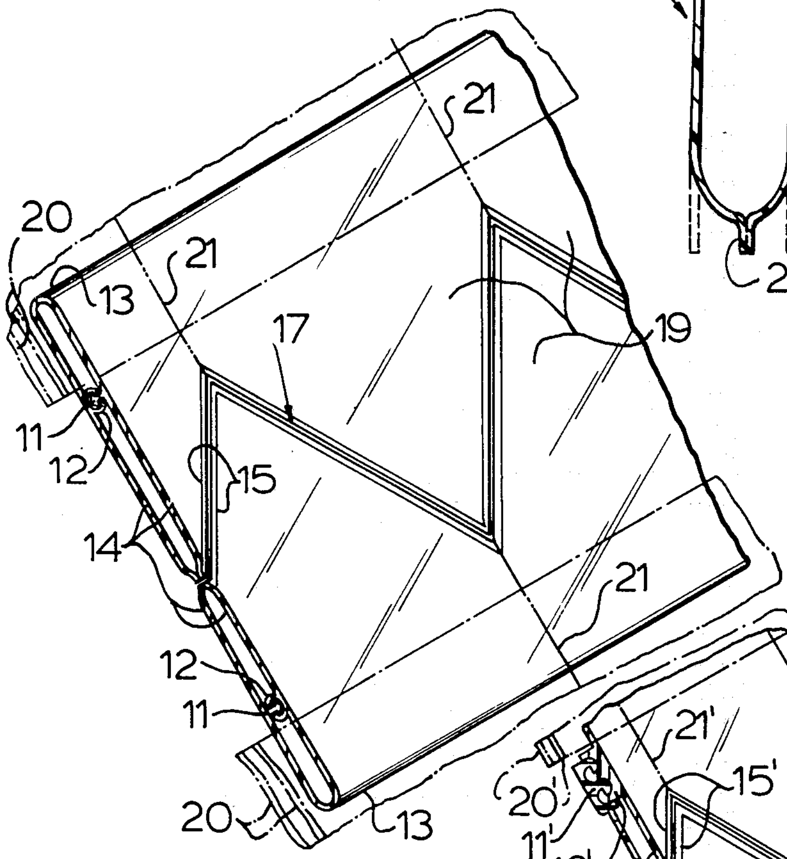
FIG. 2
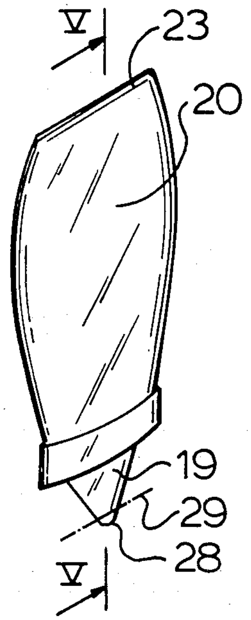
FIG. 4
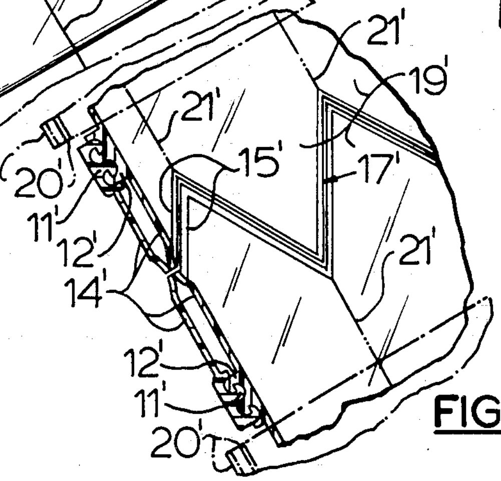
FIG. 6

FUNNEL MATERIAL FOR BAGS AND METHOD

BACKGROUND OF THE INVENTION

This invention relates to improvements in bag construction, and is more particularly concerned with bags formed from extruded plastic material, sometimes referred to as plastic film, and especially suitable for reclosable bags which are adapted to be initially hermetically sealed, and which after being opened are reclosable, and especially such bags having funnel means to facilitate pouring discrete material contents from the bags.

Bags for pourable contents, whether liquid or particulate, and equipped with funnels are described in some detail in U.S. Pat. No. 4,196,030, which to any extent necessary is incorporated herein by reference. In that patent, the funnels are formed by doubling over sheet material, securing the free-margins of the material to bag body sheet material, folding back the bag body material and sealing the folded over funnel material along a zig-zag line and separating scrap material along that line so that when the joined bag body and funnel material is separated along transverse lines between the generally triangular funnel pockets into individual bags, the funnel pockets may be directed inwardly within the bags. When it is desired to pour a pourable contents from a bag, the funnel pocket is everted, and the tips of the funnel portions snipped off to permit pouring.

Funnel bags made according to the disclosure of the aforesaid patent involved considerable waste of trimmed off material which must be factored into the cost of the bags.

SUMMARY OF THE INVENTION

An important object of the present invention is to provide a new and improved funnel material for bags and which avoids the scrap loss incurred in the prior construction and method.

Another object of the invention is to provide a new and improved construction of funnel bag making material which improves bag making efficiency and economy by simultaneously producing two sets of funnel pockets from the same elongate sheet material.

A further object of the invention is to provide new and improved funnel material for bags.

Still another object of the invention is to provide a new and improved method of making funnel material for bags.

In various embodiments of the invention, there is provided funnel material for bags comprising a pair of elongate sheet material panels in face-to-face relation, and means securing the panels along a longitudinally extending zig-zag joinder and separation line for providing a pair of strips each having a series of funnel pockets along its edge separated from the other strip.

Before or after separation of the funnel strips from one another, bag wall sheet means may be joined to the strips.

In a preferred arrangement, the funnel strips are provided with extruded profile separable fastener means.

BRIEF DESCRIPTION OF THE DRAWINGS

Other objects, features and advantages of the invention will be readily apparent from the following description of certain embodiments thereof, taken in conjunction with the accompanying drawings, although variations and modifications may be effected without departing from the spirit and scope of the novel concepts embodied in the disclosure, and in which:

FIG. 1 is a schematic illustration of a method of extruding the basic funnel material for bags;

FIG. 2 is a fragmentary perspective view of the funnel material showing how it is sealed along a zig-zag funnel-forming line and separated into a pair of funnel strips;

FIG. 3 shows how each of the funnel strips is adapted to be incorporated in a bag construction;

FIG. 4 shows the bag of FIG. 3 inverted and the funnel pocket thereof everted;

FIG. 5 is an enlarged segmental longitudinal sectional view taken substantially along the line V—V of FIG. 4;

FIG. 6 is a view similar to FIG. 2, but showing a multi-rib and groove separable fastener arrangement.

DETAILED DESCRIPTION

As shown in FIG. 1, an integral tubular extrusion E is adapted to be formed by means of an extrusion die 10 in any preferred well-known manner from thermoplastic material such as polyethylene or the like. Although exaggerated for illustrative purposes, the extrusion E is desirably of as thin a film as practicable for the intended bag size and use. Integrally extruded with or at least integrally fused onto the inner surface of the tubular extrusion are complementary sets of complementary separable fastener profiles comprising in each set a male profile rib 11 and a grooved female profile 12. The profiles 11 and 12 are so arranged that by collapsing the tubular extrustion E onto itself and bringing the profiles into registration, as shown in FIG. 2, one of the sets of profiles 11–12 will be located in adjacently spaced relation to one fold 13 of the collapsed tube and the other set of profiles 11–12 is located in spaced adjacent relation to the opposite fold 13. The collapsed tubular extrusion provides a pair of sheet panels 14 in face-to-face relation. It will be understood that in the production phase the profile carrying panels 14 are of indefinite length.

As thus produced, the collapsed tubular extrusion provides material for a pair of bag funnel strips which can be derived without waste. To this end, means are provided, in this instance comprising parallel heat seals 15, for securing the panels along a longitudinally extending zig-zag joinder and separation line 17 for providing a pair of strips 18, each having a series of funnel pockets 19 along its edge and which edge is by means of the zig-zag line 17 separated from the other strip. The zig-zag line 17 may have the parallel heat seals 15 connected by an extremely thin tear joint web, or may be completely cut through at the time the heat seals 15 are formed.

Although forming of the strips 18 from the tubular extrusion E is a preferred arrangement, the sheet panels 14 may be formed separately as flat sheets carrying the respective fastener profiles 11 and 12 which may be joined together to hold the panels aligned in face-to-face relation and facilitate forming the zig-zag joinder and separation line 17.

Whether or not the profile carrying panels 14 are formed separately or as part of the extrusion E, the edge portions of the panels 14 which are remote from each other, may be provided before or after forming of the joinder and separation line 17, with bag body wall sheets 20, which are desirably secured as by fusion sealing to the margins of the panels 14 between the profiles 11, 12 and the folds 13, and extending away from the folds 13 or edges of the panels 14, as the case may be, substantially as indicated in dash line in FIG. 2. Then, when the strips 18 are separated along the zig-zag line 17, two complete strips of bag making material including not only the funnel strips 18, but also the bag wall material 20 will be provided.

Referring to FIG. 3, the bag wall sheets on each of the funnel material strips 18 may be attached simultaneously and then after the funnel strips have been separated the bag wall sheets can be folded toward one another with the funnel pockets 19 therebetween, and can then be separated into individual bag sections by seal lines 21, as indicated in FIG. 2, and which are aligned with the junctures of the zig-zag line 17 nearest the fastener profiles 11 and 12. Each bag section will the have one of the funnel pockets 19 directed inwardly from the fastener 11, 12. Where the funnel portion of the assembly has been formed from the collapsed extrusion E, the juncture portion 13 on each bag may serve as a primary tamperproof seal, which in order to gain access into the bag must be opened as by trimming it off along a line 22.

For filling the finished bags, the bottom ends thereof are desirably left open as indicated in dash outline in FIG. 3. After filling the bags, the bottom ends of the bags are adapted to be closed by means of heat seals 23. This completes each filled bag 24.

If, instead of attaching the bag wall sheets 20 to the funnel strips 18 as indicated in FIG. 2, and then reverse folding as shown in FIG. 3, it is preferred to attach the bag wall sheets 20 individually to the funnel strips, after the funnel strips have been separated from one another, the arrangement shown in FIG. 5 may be utilized, wherein the margins of the sheets 20 are attached as by fusion 25 in face-to-face relation to the free margins of the funnel strips 18, with the body portions of the sheets 20 having the funnel pockets 19 therebetween. This forms double thickness pull flanges 27, as compared to what in effect comprises three thickness pull flanges as shown in FIG. 3.

In FIG. 6, the separable fastener structure comprises a multi-rib and groove arrangement, wherein each of the separable fastener profile structure on each of the panels 14′ has a similar dual interlock rib and groove arrangement complementary to its opposite, rather than the single rib and single groove arrangement shown in FIGS. 1 and 2. In the multi-rib groove arrangement of FIG. 6, the hook-like cross section ribs are identified as 11′, and the grooves are identified as 12′. Aside from the fastener profile arrangement, the structure of FIG. 6 may be substantially the same as in FIG. 2, the similarity being indicated by primed reference numerals, and the elements identified by those numerals coming under the same description as the elements similarly identified by the same numerals in FIG. 2. It will be understood, of course, that while the funnel structure of FIG. 6 may be made from a tubular extrusion such as demonstrated in FIG. 1, the funnel structure may be, as previously indicated, formed separately as flat sheets carrying the respective fastener profiles 11′, 12′ and which may be joined together to hold the panels alined in face-to-face relation and facilitate forming the zig-zag joinder and separation line 17′.

With any form of the bags, after filling with a liquid or discrete contents, and effecting the bottom seal 23, the contents of each bag is maintained secure until it is desired to pour the contents from the bag in the manner indicated in FIGS. 4 and 5. Then the funnel pocket 19 or 19′ is everted from within the bag between the separated fastener profiles 11 or 11′ and 12 or 12′. The funnel pocket 19 or 19′ is converted into a funnel by snipping off a tip portion 28 along the line 29, whereby to provide a pouring spout orifice 30. Because of the tapering form of the generally triangular funnel pocket 19 or 19′, the pouring cross sectional area of the orifice 30 can be readily controlled by the length of tip portion 28 removed.

From the foregoing disclosure it will be apparent that the present invention provides a new and improved, convenient, economical funnel material for bags and methods of making the same, which is free from waste and which is production intensive by virtue of the double funnel strips simultaneously attained as described.

It will be understood that variations and modifications may be effected without departing from the spirit and scope of the novel concepts of the present invention.

I claim as my invention:

1. Funnel material for bags, comprising:

a pair of elongated sheet panels in face-to-face relation and having opposite side edges;

respective sets of separable fastener profiles carried by said panels and extending in adjacently spaced parallel relation to said edges, there being one set of the profiles adjacent to one of said edges and another set of the profiles adjacent to the opposite of said edges;

and means securing said panels along longitudinally extending zig-zag joinder and separation line intermediate said sets of profiles for providing a pair of funnel strips each of which has a set of said profiles and a series of funnel pockets at an edge along said line and without wasting material.

2. Funnel material according to claim 1, wherein said sheet panels comprise a collapsed plastic tubular extrusion, with folds connecting the panels along said opposite edges.

3. Funnel material according to claim 2, having in combination therewith bag wall sheets attached along said opposite edges.

4. Funnal material according to claim 3, wherein said bag wall sheets are folded back over said opposite edges.

5. Funnel material according to claim 1, wherein said sheet panels are comprised of thermoplastic film, and said securing means comprise heat seals.

6. A method of making funnel material for bags, comprising:

providing a pair of elongated sheet panels in face-to-face relation and having opposite side edges;

providing respective sets of fastener profiles on said panels to extend in adjacently spaced parallel relation to said edges, with one of said sets of profiles adjacent to one of said edges and with another of said sets of profiles adjacent to the opposite of said edges;

and securing said panels along a longitudinally extending zig-zag joinder and separation line intermediate said sets of profiles and thereby providing a pair of funnel strips each of which has a separate set of profiles adjacent to the edge remote from said zig-zag line and a series of funnel pockets at its edge along said line and without wasting material.

7. A method of making bag making material according to claim 6, comprising attaching bag wall sheets along said opposite edges of said panels.

8. A method of making funnel material according to claim 6, comprising collapsing a plastic tubular extrusion and thereby providing said sheet panels, and forming folds connecting the panels along said opposite edges.

9. A method of making funnel material according to claim 6, comprising forming said sheet panels of thermoplastic film, and securing said panels along said line by means of heat seals.

10. Material for making bags, comprising:

a pair of elongated sheet panels in face-to-face relation and adapted for providing funnels for bags;

a bag body wall sheet attached to each opposite edge portion of each of said panels;

a respective set of separable fastener profiles along said opposite edge portions;

and means securing said panels together along an intermediate longitudinally extending zig-zag joinder and separation line for providing a pair of strips each of which has a set of said profiles and a series of funnel pockets at an edge along said line and a pair of said bag wall sheets at the opposite edge portions of the panels of the strip and without wasting material;

said bag wall sheets on each strip being arranged to receive said funnel pockets of such strip in inwardly extending relation therebetween for providing respective eversible funnels in bags in to which the strip and bag wall sheets are adapted to be divided.

11. Material according to claim 10, wherein said sheet panels comprise a collapsed plastic tubular extrusion, with folds connecting the panels along their edges remote from said zig-zag line.

12. Material according to claim 11, wherein said panels have extruded separable fastener profiles adjacently spaced relation to said folds.

13. Material according to claim 10, wherein said sheet panels comprise thermoplastic film, and said securing means comprise heat seals.

14. A method of making bag making material, comprising:

providing a pair of elongated sheet panels in face-to-face relation and adapted for providing funnels for bags;

attaching a bag body wall sheet to each opposite edge portion of each of said panels;

providing a respective set of separable fastener profiles along said opposite edge portions;

and securing said panels together along an intermediate longitudinally extending zig-zag joinder and separation line and thereby providing a pair of strips each of which has a series of funnel pockets at its edge along said line and also a pair of said bag wall sheets and a set of fastener profiles at the opposite edge portions of the panels of the strip and without wasting material;

and arranging said bag wall sheets to receive said funnel pockets of each strip in inwardly extending relation therebetween and relative to said fastener profiles for providing respective eversible funnels in bags into which the strips and bag wall sheets are adapted to be divided.

15. A method of making bag making material according to claim 14, comprising collapsing a plastic tubular extrusion and thereby providing said sheet panels, and forming folds connecting the panels along their edges remote from said zig-zag line and with said fastener profiles adjacently spaced from said folds.

16. A method of making bag material according to claim 15, comprising providing said profiles integrally extruded with said extrusion.

17. A method of making funnel material according to claim 14, comprising forming said sheet panels of thermoplastic film, and securing said panels along said line by means of heat seals.

18. A method of making funel strips for bags, comprising:

forming continuous length plastic film material into a plurality of coextensive funnel strips connected together as formed;

providing each of the funnel strips with a first zig-zag edge defining a series of funnel pockets therealong and a second edge spaced from said zig-zag edge;

providing each of the funnel strips with a respective set of cooperative fastener profiles along said second edge spaced from said zig-zag edge; and separating the funnel strips from one another.

19. A method according to claim 18, which comprises providing said zig-zag edges along a common joinder and separation line extending along said plastic film material and without wasting material.

* * * * *